Nov. 2, 1943.    H. E. BRANNON    2,333,291
TEMPERATURE RESPONSIVE DEVICE
Filed June 19, 1940    2 Sheets-Sheet 2
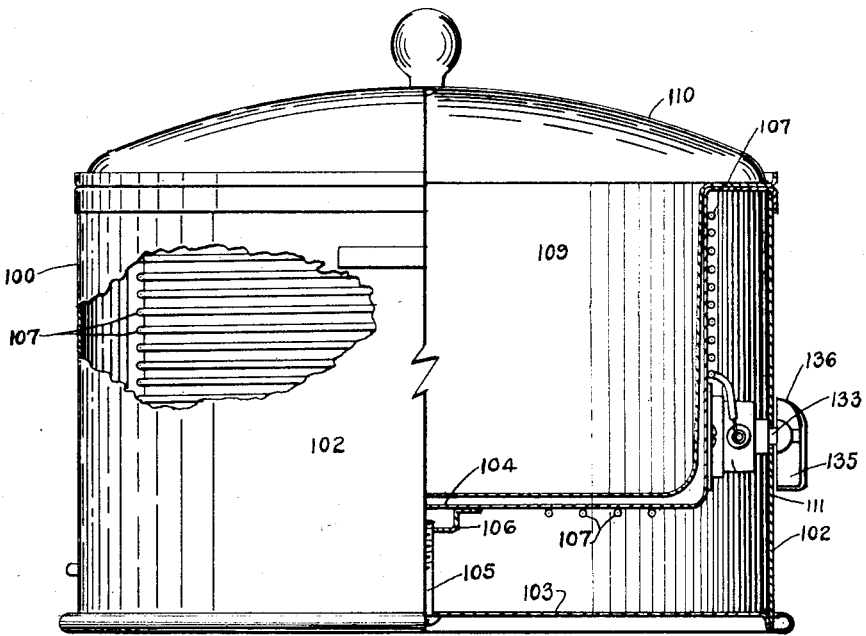
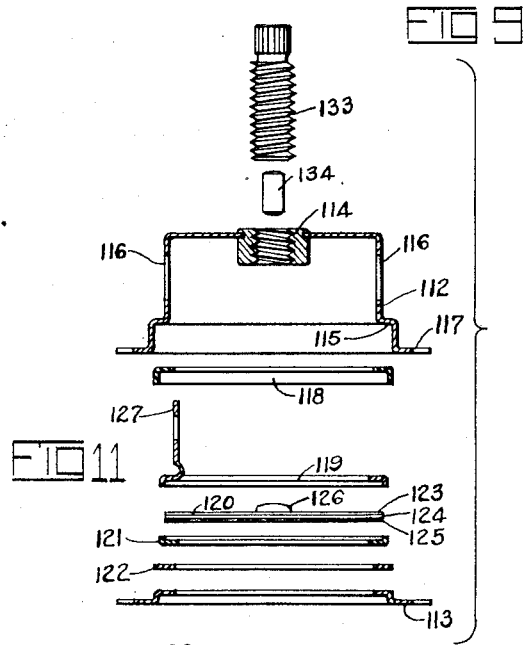
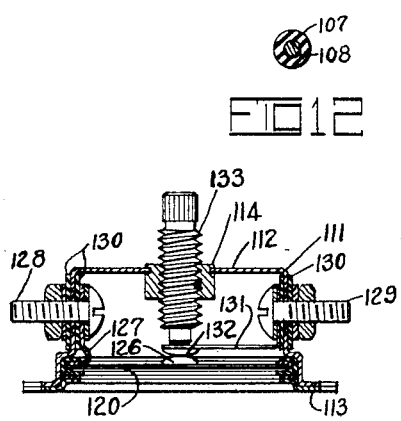
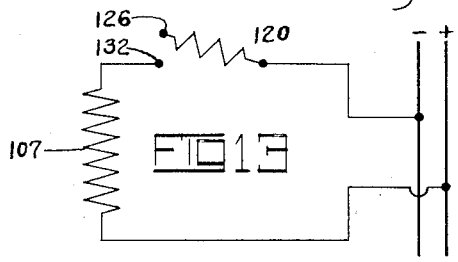
INVENTOR
HERBERT E. BRANNON
BY *Carroll R. Taber*
ATTORNEY Patented Nov. 2, 1943

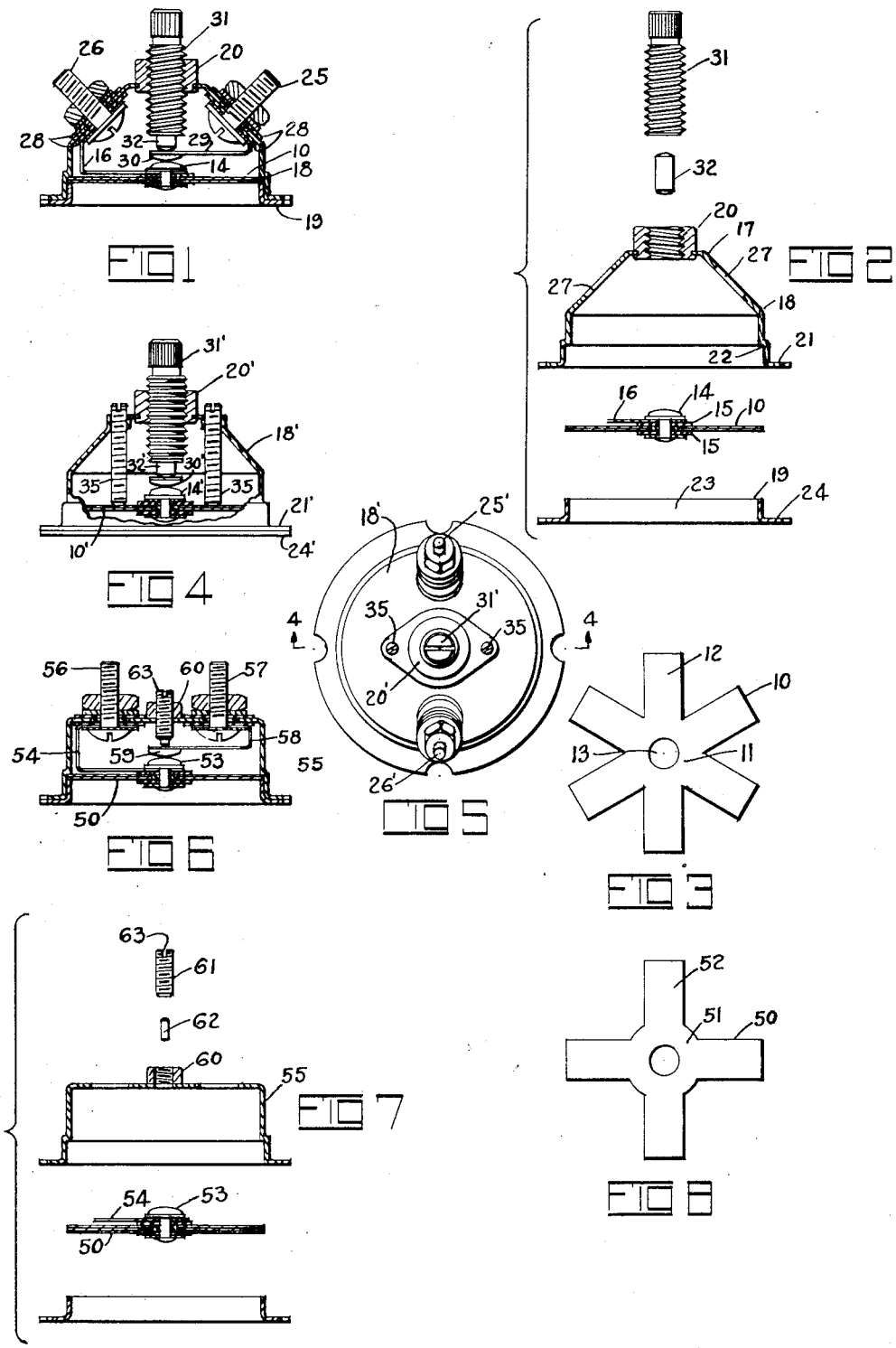

2,333,291

UNITED STATES PATENT OFFICE 2,333,291

TEMPERATURE RESPONSIVE DEVICE

Herbert E. Brannon, Detroit, Mich.

Application June 19, 1940, Serial No. 341,243

10 Claims. (Cl. 200—138)

This invention relates to temperature responsive devices of the type having as an essential part a laminated metal element adapted to deflect under the influence of variations in the temperature thereof.

This application is a continuation in part of my co-pending application Serial No. 234,190, filed October 10, 1938.

The principal object of this invention is to provide a temperature responsive device of novel construction, low cost, accurate operation, and compact arrangement. Another object of the invention is the provision of a laminated metal temperature responsive device of novel construction by means of which the previous object is primarily attained. Still another object is the provision of a novel adjustable temperature control or thermostat. A still further object is to provide a temperature control for the heating elements of electric heating circuits which not only acts under the influence of variations in the temperature of the heating element or device heated thereby, but under the influence of variations in the power input to the heating element of the circuit as well. Another object is the provision of a temperature control for an electric heating element which is directly responsive to variations in the power input to the heating circuit and acts substantially instantaneously upon a change in the power input.

Basically the invention resides in a laminated metal element having a contact at its center and a plurality of arms radiating therefrom. The laminated element is mounted on a supporting structure solely by means of the extremities of the arms. The element is mounted in a manner to permit a slight radial shifting of the ends of the arms relative to the support so as to permit flexing of the element.

The foregoing objects will more fully appear in the following specification, reference being made to the accompanying drawings, wherein:

Figure 1 is a cross-sectional view of an adjustable thermostat embodying the invention;

Figure 2 is an exploded view of the thermostat shown in Figure 1, certain parts being omitted;

Figure 3 is a plan view of the laminated temperature responsive element employed in the device shown in Figures 1 and 2;

Figure 4 is a cross-sectional view of a somewhat modified form of the invention taken on the line 4—4 of Figure 5;

Figure 5 is a plan view of the device shown in Figure 4;

Figure 6 is a cross-sectional view of a still further modified form of the invention;

Figure 7 is an exploded view of the device shown in Figure 6, certain parts being omitted;

Figure 8 is a plan view of the laminated temperature responsive element embodied in the device shown in Figures 6 and 7;

Figure 9 is a front elevational view of a cooking vessel to which a modified form of the invention is applied, parts of the vessel being broken away to show the interior construction;

Figure 10 is a cross-sectional view of the modified control employed with the device of Figure 9;

Figure 11 is an exploded view of the control shown in Figure 10;

Figure 12 is a cross-sectional view of the wire used in the heating element of the device shown in Figure 9; and Figure 13 is a wiring diagram of the device shown in Figure 9.

Referring now more in detail to the drawings, and particularly to Figures 1 to 3 thereof, the invention comprises a temperature responsive element 10. The element 10 is a laminated metal piece made up of two sheets of metal having dissimilar coefficients of expansion and suitably bonded together. The element 10 is shaped to provide a central portion 11 having a plurality of arms 12 radiating therefrom, the extremities of the arms being spaced apart, preferably equidistantly. A hole 13 is formed in the center of the element 10 to receive a contact 14. The hole 13 is substantially larger than the shank of the contact 14, and in order to insulate the contact from the element 10 a pair of washers 15 of mica or similar insulation are located between the heads of the contact 14 and the element 10. A connecting strip 16 is secured to the contact and extends outwardly therefrom.

The element 10 is mounted within a housing 17. The latter consists of three parts, a main body portion 18, a retaining ring 19 and an internally threaded bushing 20. The main body portion 18 is provided with a peripheral flange 21 at its open end, and an offset shoulder 22 intermediate its ends. The retaining ring 19 consists of a cylindrical portion 23 fitting within the body portion 18, and a peripheral flange 24 in juxtaposed parallel relation to the flange 21. The bushing 20 is secured in any suitable manner to the end of the housing opposite the retaining ring 19.

The temperature responsive element 10 is mounted within the housing 17, with the extremities of the arms 12 located between the offset shoulder 22 and the free end of the cylindrical portion 23 of the retaining ring 19. The element 10 fits loosely in the space between the shoulder 22 and the ring 19 in order to permit flexing of the element 10.

A pair of terminal screws 25 and 26 are mounted in openings 27 in the housing 17 and are insulated from the latter by washers 28 of mica or similar insulating material. The connecting strip 16 is attached to the terminal screw 26.

Secured to the screw 25 is a flexible strip 29 of spring metal carrying a contact 30 at its free end. The contact 30 is arranged in a position permitting it to touch contact 14 under certain conditions. The spring metal strip 29 is stressed so that it tends to spring away from the contact 14.

Threaded into the bushing 20 is an adjusting screw 31 arranged in alignment with the contacts 14 and 30. In its inner end is a socket which receives an insulating bar 32. The latter normally bears against the flexible strip 29. The outer end of the adjusting screw 31 is knurled in order that it may be easily rotated.

The device just described is adapted for use in any electrical temperature control circuit. The flanges 21 and 24 of the housing are secured to any suitable support by screws, bolts, or other fastening means, not shown. The terminal screws are connected to wires in the control circuit, so that current flowing therein must pass through the strips 16 and 29 and the contacts 14 and 30. If the contacts do not touch each other no current can flow in the circuit.

The laminated metal temperature responsive element 10 is adapted to deflect in a direction away from the contact 30 as the temperature of element 10 rises due to ambient temperature, and deflect in the opposite direction as its temperature decreases. Thus, upon predetermined increase in the temperature of the laminated element the contacts will separate and break the circuit controlling the temperature of the space surrounding the thermostat. The temperature at which the circuit will be broken can be regulated by turning the screw 31 in or out as desired. If turned in toward the contacts 14 and 30, a greater deflection and correspondingly higher temperature of the laminated element 10 is required to break the circuit. This is due to the fact that the element 10 is placed under an initial stress or deflection which must be overcome before there will be any movement of the contact 14.

Figures 4 and 5 show a slightly modified form of the invention. As a whole the construction illustrated in Figures 4 and 5 is substantially identical to that previously described. In this device, however, a screw 31' having threads of less pitch than screw 30 is employed. Therefore, the same amount of rotation, the range of temperature controlled by the screw 31' is less than that of the previous device. As a result, the adjustment of the screw can be more closely regulated than in the previous device.

This modification of the invention is also provided with a pair of limit screws 35 for adjusting the "off" position of the thermostat. The screws 35 are threaded through the housing on opposite sides of the screw 31' and their inner ends are located in a position to engage opposite arms of the laminated element 10'. By means of the screws 35 the element 10' may be placed under predetermined initial stress requiring the attainment of a desired temperature before deflection of the element 10 can begin. Thus, the screw 31' may be used to regulate the temperatures above that for which the screws 35 are set, but when the screw 31' is backed out sufficiently to permit contact 30' to disengage contact 14', the circuit is broken. For instance, if the screws 35 are set so that a temperature of 70° is required to deflect the element 10', the screw 31' may be used to increase this stress, or in other words, regulate the temperatures above 70°. However, as soon as screw 31' is backed out to a setting which normally would hold the temperature at 69° the circuit is broken. This allows the circuit to be broken if desired without turning back the screw 31' several turns, or if the thermostat is designed to operate only within a 360° adjustment of the screw 31', it permits elimination of the master switch which otherwise would be necessary.

The device illustrated in Figures 6, 7 and 8 is a slightly modified form of the invention. It differs from those previously disclosed in the shape of the laminated metal element and in the type of adjusting screw.

The device comprises a laminated metal element 50, having a central portion 51 and four arms 52. The element 50 carries a contact 53 at its center and a connecting strip 54 similar to those previously described. The element 50 is mounted in a housing 55 to which are secured two terminal screws 56 and 57. A resilient strip 58 connects one terminal 57 to a contact 59 engageable with contact 53.

A bushing 60 is welded to the housing 55. The bushing is screw threaded to receive a screw 61. The inner end of the screw 61 has a recess to receive an insulating rod 62. A slot 63 is provided in the outer end of the screw to accommodate a screw driver.

In general the operation of the species shown in Figures 6 to 8 is the same as those previously shown. However, the range of adjustment is not so great as the previous modifications. This device is intended primarily for use as a fixed thermostat, which once set is not to be changed. The adjusting screw is therefore of less length than the screw used in the previously described device and has no knurled knob.

Figures 9 to 13 illustrate a further modified form of the invention. It is shown in connection with an electrically heated cooker 100. The cooker comprises an outer shell having a side wall 102 and a bottom wall 103. Supported on the upper edge of the side wall 102 is an inner pan and heating element support 104. The inner pan is held in place within the outer shell by a screw 105 extending through the bottom wall 103 and threaded into a bracket 106 secured to the bottom of the inner pan 104.

The heating element consists of coils of resistance wire 107 wound about the sides and bottom of the inner pan 104. The resistance wire is covered with suitable thermal and electrical insulating material 108 (see Figure 12), such as asbestos, and is wound directly on the inner pan 104.

A removable cooking pot 109 is placed within the inner pan 104, and a removable cover 110 is placed over the entire assembly.

Mounted on the side wall of the inner pan 104 is the temperature control device 111. It comprises a housing made up of three parts, a main body 112, an annular retaining ring 113, and an internally threaded bushing 114. The main body portion 112 has a shoulder 115 intermediate its ends. A pair of openings 116 are formed in its opposite sides. The bushing 114 is crimped or otherwise secured in the center of the end of the main body portion 112 opposite the retaining ring. The retaining ring 113 fits over a flange 117 at the open end of the main body 112 and is secured thereto.

Mounted in the groove formed by the shoulder 115 and the retaining ring 113 are an insulating ring 118, a metal connecting ring 119, a laminated metal temperature responsive element 120 which is a resistor, another metal connecting ring 121, and a second insulating ring 122, in the order named.

The laminated metal element 120 is formed from three sheets of metal 123, 124 and 125. Two of the sheets 123 and 124 have the same coefficient of expansion, but a different coefficient than sheet 125. One of the two sheets 123, 124 has a higher internal resistance than the other. The element 120 is formed as in Figure 3 or Figure 8, having a plurality of angularly separated arms radiating from its center. At the center is a contact 126.

The connecting rings 119 and 121 are of angular cross-section and are adapted, when placed together, to enclose the ends of the arms on the element 120. The element 120 fits loosely between the rings 119 and 121 to permit a slight radial shifting thereof so that the element 120 may flex slightly. The ring 119 is provided with an integral connecting link 127 extending axially thereof.

The insulating ring 118 is of angular cross-section. The insulating ring 122 is flat. When placed together as in Figure 10 the two insulating rings 118 and 122 surround the metal connecting rings 119 and 121 and the laminated element 120 and separate them from direct contact with the parts 112 and 113 of the metal housing.

In the holes 116 in opposite side walls of the main body portion 112 of the housing are terminal screws 128 and 129. They are insulated from the housing by washers 130 of mica or other suitable insulation. The terminal screw 128 is connected to the connecting link 127. The terminal screw 129 is connected to and supports a spring metal strip 131 within the housing. At its free end the spring metal strip 131 carries a contact 132 which is adapted under normal conditions to touch the contact 126 on the laminated element 120. The metal strip 131 is stressed in such a way that it tends to move the contact 132 away from the contact 126.

Threaded into the bushing 114 is an adjusting screw 133. The inner end of the screw 133 has a recess that receives a short rod of insulating material 134 which is adapted to be pressed against the back of the spring metal strip 131. The outer end of the adjusting screw 133 is provided with a handle 135. The handle provides for rotation of the screw 133 and has a pointer 136 thereon which cooperates with a dial (not shown) on the outer shell 102 to indicate the setting of the thermostat.

The temperature control 111 is connected in series with the heating element 107 as indicated in Figure 13. The laminated element 120 is in the circuit by virtue of its connection with the terminal screw 128 through the connecting link 127. Thus, the current for energizing the heating element 107 must flow through the laminated element 120. The path of the current through the thermostat is between the terminal screws 128 and 129 by way of resilient spring metal strip 131, contact 132, contact 126, element 120, connecting rings 119—121, and connecting link 127.

The manner of adjustment of the thermostatic control 111 is the same as those previously described. That is, the contact 132 is moved toward or away from contact 126 by rotation of screw 133. The screw 133 is rotated by handle 135.

Also, under ordinary conditions the operation of the thermostatic control 111 is the same as the other controls. The laminated metal element 120 is caused to flex by variations in its temperature created by the heat transmitted to it from the cooking vessel 109. Thus, the circuit including the heating element is made or broken by the thermostatic control 111 to maintain a substantially constant temperature.

Under certain conditions, however, the control 111 shown in Figures 9 to 12 produces an additional result not obtainable by the previously described controls. That result is the compensation for variations in power input caused by changes in line voltage or short circuits in the heating element 107.

When the current is on and flowing through the heating element 107, it also passes through the element 120 and heats it slightly because of its own internal resistance. The heat produced in this manner under normal conditions is relatively slight and has practically no effect on the bending of the element 107. However, if the power input from the line should increase sharply as it sometimes does, the additional current causes the element 120 to heat up appreciably and deflect away from the contact 132, thereby breaking the circuit.

The advantage of this arrangement lies in the fact that the control of the temperature within the cooking pot is maintained more constant than it would be by a thermostat under the influence of ambient temperature only. Where the power input from the line increases sharply, as it does when the load on the line drops, the heating element 107 becomes hotter and transmits more heat to the cooking pot 109. However, it requires a certain amount of time for the additional heat to raise the temperature of the cooking pot 109 to the point where it alone will actuate the switch 111. Ordinarily by the time the temperature of the cooking pot 109 could be raised sufficiently to actuate the switch, a considerable quantity of heat would be stored in the heating element 107 and walls of the inner pan 104. The heat thus stored would cause the pot 109 to overheat even though the current was off.

Such a result is overcome by the presence of the laminated resistor element 120 in the circuit. Any increase in the power input in the circuit causes the resistor to heat up and flex so as to break the circuit even before the control switch would be actuated by ambient temperature alone. No excess heat is stored in the heating element and as a result the cooking pot 109 cannot overheat.

The same result occurs if a short circuit in the heating element develops. A short circuit permits more current to flow through the laminated resistor element 120, thereby increasing its temperature and causing it to flex and break the circuit.

The modification shown in Figures 9 to 12 has still another effect not obtained in the previously described devices. It eliminates the need for accurately measuring the resistance of the wire employed in the heating element with which the control is associated.

Resistance wire for electric heating elements is usually drawn or rolled and its cross section varies somewhat. This produces variations in the resistance of unit lengths of the wire. Hence, in order to produce heating elements of equal heating capacity, it is necessary to measure the resistance of the wire in each individual unit and cut it to the requisite length. If this is not done, different coils will produce different temperatures under otherwise identical conditions.

When a thermostatic control such as illustrated in Figures 9 to 12 is employed with a heating element, it is unnecessary to provide equal resistances in all heating elements of like kinds, because the laminated resistor 120 compensates for ordinary variations in resistance. Thus, if the resistance of the heating element is more or less than the desired amount, the current flowing in the circuit will vary inversely in relation to the amount of resistance. Therefore, the laminated resistor 120 will be heated to a greater or less degree, depending on the current flowing through it, and will make and break the circuit intermittently at a rate which will maintain the desired temperature in the heating element. This will occur whether the resistor 120 is exposed to the heat from the heating element or not. As a result, the wires used in different heating coils of the same desired heating capacity can all be cut to a definite length.

The invention desired above, because of its unique construction, is more compact and less costly than previous devices employed in the same general way. Instead of a long narrow strip supported at one end only, the temperature responsive element consists of a central contact and a plurality of arms radiating therefrom and supported at the extremities of the arms. The amplitude of movement of the latter construction, for a given temperature change, is greater than that of a strip of the same length and supported at one end only. Thus, a smaller housing may be employed, and less of the relatively expensive laminated metal may be used. Furthermore, the deflection under temperature changes is more positive as well as more constant than previous types of temperature responsive elements.

The scope of the invention is indicated in the appended claims.

I claim:

1. A temperature responsive device comprising a laminated metal element and a support therefor, two laminae of said element having different coefficients of thermal expansion, said element including a plurality of arms radiating from its center, said arms having circumferentially spaced apart outer extremities engaging said support and being movable independently of each other relative thereto in the plane of said element, said engagement of the arms with the support constituting the sole means for supporting said element.

2. A temperature responsive device comprising a laminated metal element and a support therefor, two laminae of said element having different coefficients of thermal expansion, said element including an electrical contact at its center engageable with another electrical contact on said support, and a plurality of arms radiating from said contact, the extremities of the arms being mounted on said support and movable independently of each other relative thereto in the plane of said element.

3. A temperature responsive device comprising a laminated metal element and a support therefor, two laminae of said element having different coefficients of thermal expansion, said element including an electrical contact at its center engageable with another electrical contact adjustably mounted on said support, and a plurality of arms radiating from the contact on said element, the extremities of said arms being mounted on said support and movable independently of each other relative thereto in the plane of said element, and means on said support for varying the position of the contact on the support relative to the contact on the laminated element.

4. A temperature responsive device comprising a laminated metal element and a support therefor, two laminae of said element having different coefficients of thermal expansion, said element including an electrical contact at its center and a plurality of arms radiating therefrom, the extremities of said arms being mounted upon said support and movable independently of each other relative thereto in the plane of the element, and another electrical contact mounted upon said support and adjustable toward and away from said first mentioned contact.

5. A thermostat comprising a laminated metal element and a housing therefor, two laminae of said element having different coefficients of thermal expansion, said element including an electrical contact at its center and a plurality of arms radiating therefrom, the extremities of said arms being mounted on said housing and forming the sole support for said element, a pair of spaced terminals secured to said housing, a connection between one terminal and said contact, a second contact adjacent said first mentioned contact, resilient means biasing said second contact away from said first contact and connecting said second contact to the other terminal, and adjustable means on said housing for moving said second contact toward the first contact against the action of the resilient means.

6. In a thermostat, a laminated metal element and a support therefor, two laminae of said element having different coefficients of thermal expansion, said element comprising a plurality of arms radiating from its center, the extremities of said arms being mounted on said support and forming the sole support for said element, the extremities of the arms being movable independently of each other in the plane of the element relative to said support.

7. A temperature responsive device comprising a laminated metal element and a support therefor, two laminae of said element having different coefficients of thermal expansion, said element including an electrical contact at its center in engagement with another electrical contact mounted on said support, and a plurality of arms radiating from the contact on said element, the extremities of said arms being mounted on said support and movable independently of each other relative thereto in the plane of said element, said element being adapted to deflect under the influence of variations in the temperature thereof whereby to move the contact thereon toward and away from the contact on the support, means on said support for varying the position of the contact on the support relative to the contact on the laminated element, and adjustable means on said support for limiting the movement of the contact on said element toward the contact on the support.

8. A thermostat comprising a support, a first contact on said support, a second contact, and means for moving said second contact into and out of engagement with said first contact, said means consisting of a laminated metal element secured at its center to said second contact, two laminae of said element having different coefficients of thermal expansion, said element including a plurality of arms radiating from its center, said arms having circumferentially spaced apart outer extremities engaging said support and being movable independently of each other relative thereto in the plane of said element, said engagement of the arms with the support constituting the sole means for supporting said element.

9. A thermostat comprising a support, a first contact on said support, a second contact, and means for moving said second contact into and out of engagement with said second contact, said means consisting of a laminated metal element secured at its center to said second contact, two laminae of said element having different coefficients of thermal expansion, said element having a plurality of arms radiating from its center, said arms having circumferentially spaced apart outer extremities engaging said support and being movable independently of each other relative thereto in the plane of said element, said engagement of the arms with the support constituting the sole means for supporting said element, said first contact being adjustably mounted on said support for movement relative thereto in a direction toward and away from said second contact.

10. A thermostat comprising a support, a first contact on said support, a second contact, means for moving said second contact into and out of engagement with said first contact, said means consisting of a laminated metal element secured at its center to said second contact, two laminae of said element having different coefficients of thermal expansion, said element including a plurality of arms radiating from its center, said arms having circumferentially spaced apart outer extremities engaging said support and being movable independently of each other relative thereto in the plane of said element, said engagement of the arms with the support constituting the sole means for supporting said element, and means adjustably mounted on said support for limiting the movement of the second contact toward the first contact.

HERBERT E. BRANNON.